(12) United States Patent
Nakano et al.

(10) Patent No.: US 10,411,534 B2
(45) Date of Patent: Sep. 10, 2019

(54) ROTOR AND ROTATING ELECTRIC MACHINE

(71) Applicant: MITSUBISHI ELECTRIC CORPORATION, Chiyoda-ku, Tokyo (JP)

(72) Inventors: Aiko Nakano, Tokyo (JP); Atsushi Sakaue, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 73 days.

(21) Appl. No.: 15/580,021

(22) PCT Filed: Sep. 27, 2016

(86) PCT No.: PCT/JP2016/078442
§ 371 (c)(1),
(2) Date: Dec. 6, 2017

(87) PCT Pub. No.: WO2017/061305
PCT Pub. Date: Apr. 13, 2017

(65) Prior Publication Data
US 2018/0183286 A1 Jun. 28, 2018

(30) Foreign Application Priority Data

Oct. 9, 2015 (JP) ................................. 2015-200640

(51) Int. Cl.
*H02K 21/12* (2006.01)
*H02K 1/27* (2006.01)
(52) U.S. Cl.
CPC ........... *H02K 1/274* (2013.01); *H02K 1/2766* (2013.01); *H02K 2213/03* (2013.01)
(58) Field of Classification Search
CPC ... H02K 1/274; H02K 1/2766; H02K 2213/03
(Continued)

(56) References Cited

U.S. PATENT DOCUMENTS 6,437,473 B1 * 8/2002 Mobius ................ H02K 1/2766
29/598
8,294,320 B2 * 10/2012 Vyas ...................... B60L 50/51
310/156.57
(Continued)

FOREIGN PATENT DOCUMENTS

CN      103780038 A    5/2014
JP      2008-067474 A  3/2008
(Continued)

OTHER PUBLICATIONS

International Search Report (PCT/ISA/210) dated Dec. 20, 2016, by the Japanese Patent Office as the International Searching Authority for International Application No. PCT/JP2016/078442.
(Continued)

*Primary Examiner* — Yuriy Semenenko
(74) *Attorney, Agent, or Firm* — Buchanan Ingersoll & Rooney PC

(57) ABSTRACT

The rotor includes: a rotor core having a plurality of insertion holes penetrating in an axial direction at intervals in a circumferential direction; and magnets respectively provided in the insertion holes. A space is formed between a hole inner side peripheral surface of each insertion hole and a magnet inner side peripheral surface of each magnet. An adhesion layer portion is formed between a hole outer side peripheral surface of each insertion hole and a magnet outer side peripheral surface of each magnet, and the hole outer side peripheral surface of each insertion hole and the magnet outer side peripheral surface of each magnet with which the adhesion layer portion contacts are formed in a flat-surface shape. A width in a radial direction of the space is longer than a width in the radial direction of the adhesion layer portion.

20 Claims, 17 Drawing Sheets

(58) Field of Classification Search
USPC .................................... 310/156.01, 156.39
See application file for complete search history.

(56) References Cited

U.S. PATENT DOCUMENTS

| | | | | |
|---|---|---|---|---|
| 2008/0303368 | A1* | 12/2008 | Rahman | H02K 1/276 310/156.56 |
| 2009/0045689 | A1* | 2/2009 | Haruno | H02K 1/276 310/156.56 |
| 2010/0079026 | A1* | 4/2010 | Han | H02K 1/2766 310/156.53 |
| 2010/0141076 | A1* | 6/2010 | Blissenbach | H02K 1/2766 310/156.53 |
| 2012/0194026 | A1* | 8/2012 | Matsuoka | H02K 1/2766 310/156.53 |
| 2014/0217859 | A1* | 8/2014 | Saito | H02K 1/276 310/68 D |
| 2015/0028709 | A1* | 1/2015 | Ueda | H02K 1/2706 310/156.19 |
| 2016/0380493 | A1* | 12/2016 | Matsumoto | H02K 1/2766 310/156.21 |
| 2018/0268976 | A1* | 9/2018 | Yasumura | H02K 1/2766 |

FOREIGN PATENT DOCUMENTS

| | | |
|---|---|---|
| JP | 2012-196062 A | 10/2012 |
| JP | 2015-006124 A | 1/2015 |

OTHER PUBLICATIONS

Written Opinion (PCT/ISA/237) dated Dec. 20, 2016, by the Japanese Patent Office as the International Searching Authority for International Application No. PCT/JP2016/078442.

Office Action dated May 17, 2019, by the Chinese Patent Office in corresponding Chinese Patent Application No. 201680040916.7 and English translation of the Office Action. (16 pages).

* cited by examiner

ROTOR AND ROTATING ELECTRIC MACHINE

TECHNICAL FIELD

The present invention relates to a rotor and a rotating electric machine in which reduction of torque performance can be suppressed and magnets can be stably held.

BACKGROUND ART

In recent years, rotating electric machines used as electric motors and electric generators are required to have small sizes and be capable of high-speed rotation and high output. In one of methods for realizing such a rotating electric machine having a small size and capable of high-speed rotation and high output, reluctance torque is utilized with a shape in which magnets are embedded in a rotor, and the reluctance torque is combined with magnet torque due to magnets, thereby increasing generated torque.

However, in the case of attempting to achieve size reduction, high-speed rotation, and high output of a rotating electric machine, there is a problem that generated torque might greatly vary depending on the shapes of magnets embedded in the rotor. Accordingly, it is conventionally proposed that the magnet shape is formed to be convex inward in the radial direction from a rectangular shape, thereby utilizing reluctance torque and improving generated torque (see, for example, Patent Document 1).

CITATION LIST

Patent Document

Patent Document 1: Japanese Laid-Open Patent Publication No. 2015-6124

SUMMARY OF THE INVENTION

Problems to be Solved by the Invention

In the conventional rotor and rotating electric machine, the magnet shape is formed to be convex inward in the radial direction, thereby improving torque. However, using such a magnet shape as to be convex inward in the radial direction causes problems that it is difficult to mold such magnets, it is difficult to perform positioning for insertion into magnet insertion holes, it is difficult to hold the magnets at the time of insertion thereof, and it is difficult to apply an adhesive agent to the magnets.

The present invention has been made to solve the above problems, and an object of the present invention is to provide a rotor and a rotating electric machine in which reduction of torque performance can be suppressed and magnets can be stably held.

Solution to the Problems

A rotor according to the present invention includes: a rotor core in which a plurality of insertion holes penetrating in an axial direction are formed at intervals in a circumferential direction; and magnets respectively provided in the insertion holes. A hole inner side peripheral surface of each insertion hole and a magnet inner side peripheral surface of each magnet are not in contact with each other so that a space is formed therebetween. An adhesion layer portion is formed between a hole outer side peripheral surface of each insertion hole and a magnet outer side peripheral surface of each magnet, and the hole outer side peripheral surface of each insertion hole and the magnet outer side peripheral surface of each magnet with which the adhesion layer portion contacts are formed in a flat-surface shape. A width in a radial direction of the space is longer than a width in the radial direction of the adhesion layer portion.

A rotating electric machine according to the present invention includes: the rotor configured as described above; a rotary shaft for rotating the rotor core; and a stator having a coil and located with an air gap from the rotor.

Effect of the Invention

In the rotor and the rotating electric machine according to the present invention, reduction of torque performance can be suppressed and magnets can be stably held.

DESCRIPTION OF EMBODIMENTS

Embodiment 1

Figure 1:
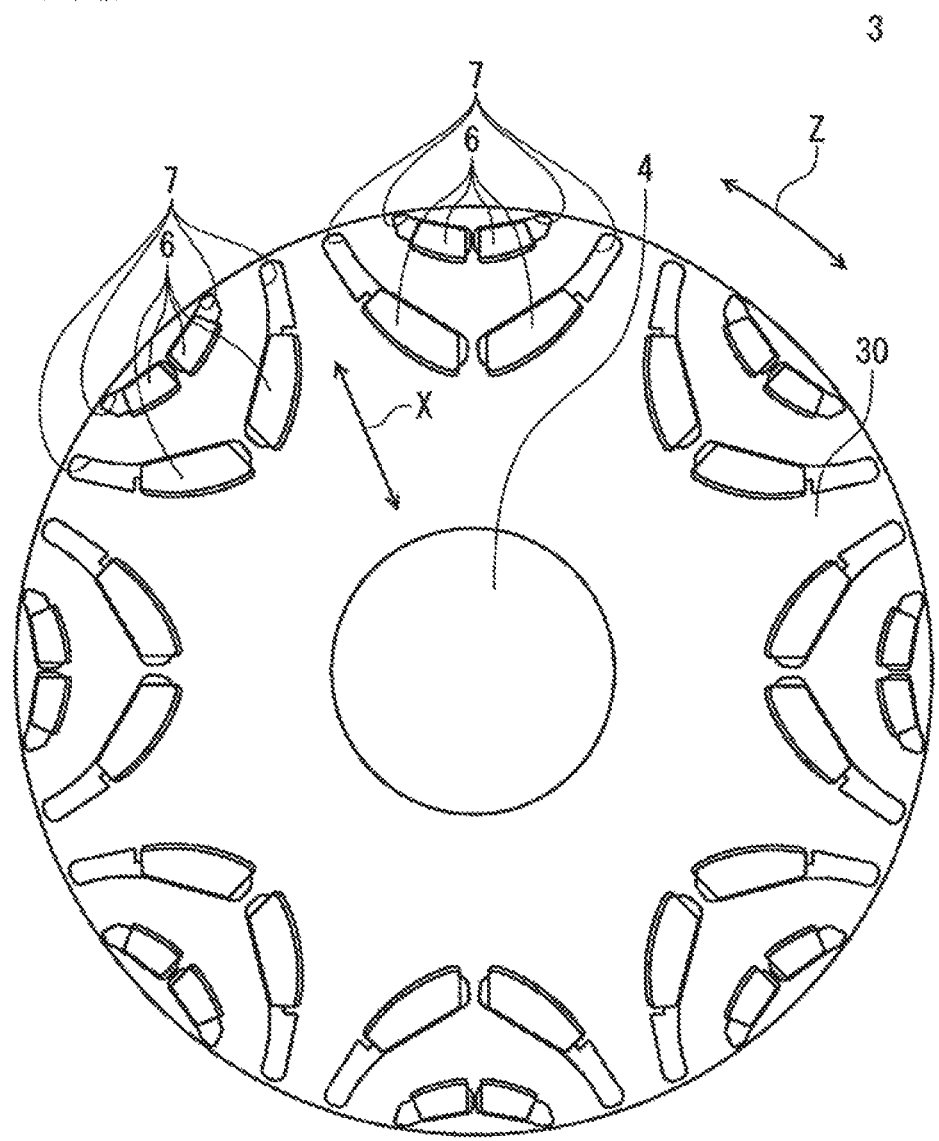
FIG. 1 is a plan view showing the structure of a rotor according to embodiment 1 of the present invention.
Figure 2:
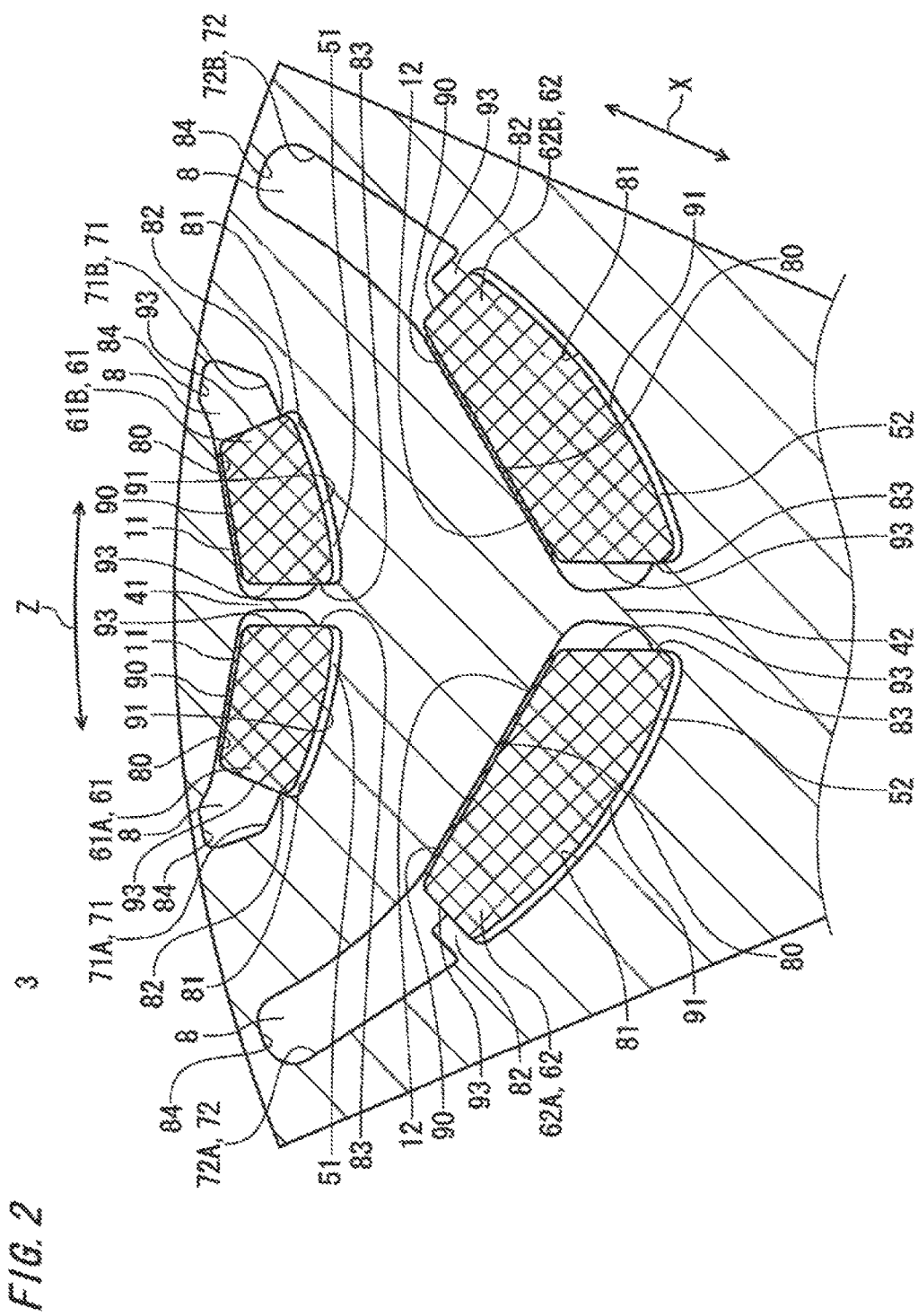
FIG. 2 is a partially enlarged plan view showing the structure of the rotor shown in FIG. 1.
Figure 3:
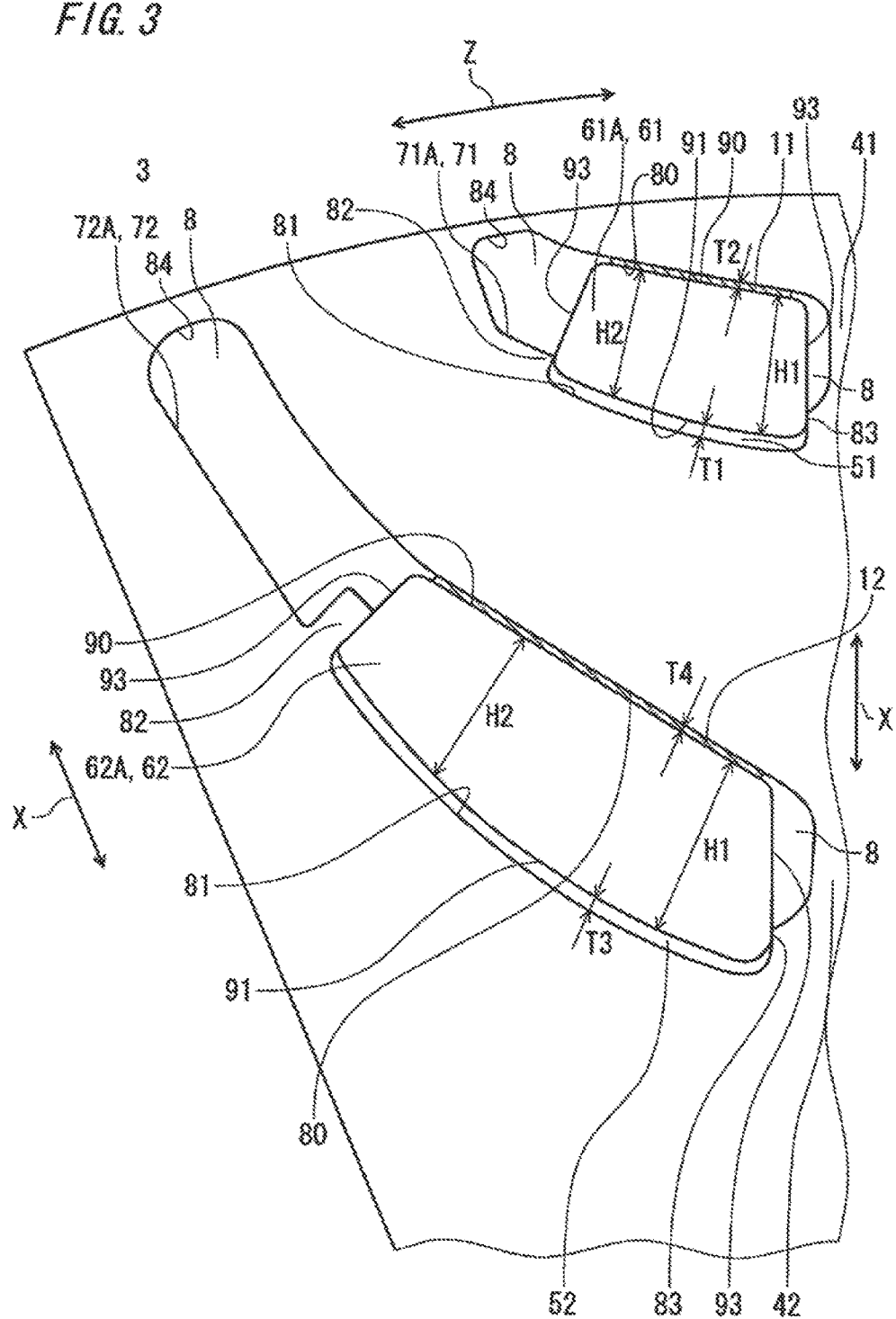
FIG. 3 is a partially enlarged plan view showing the structure of the rotor shown in FIG. 2.
Figure 4:
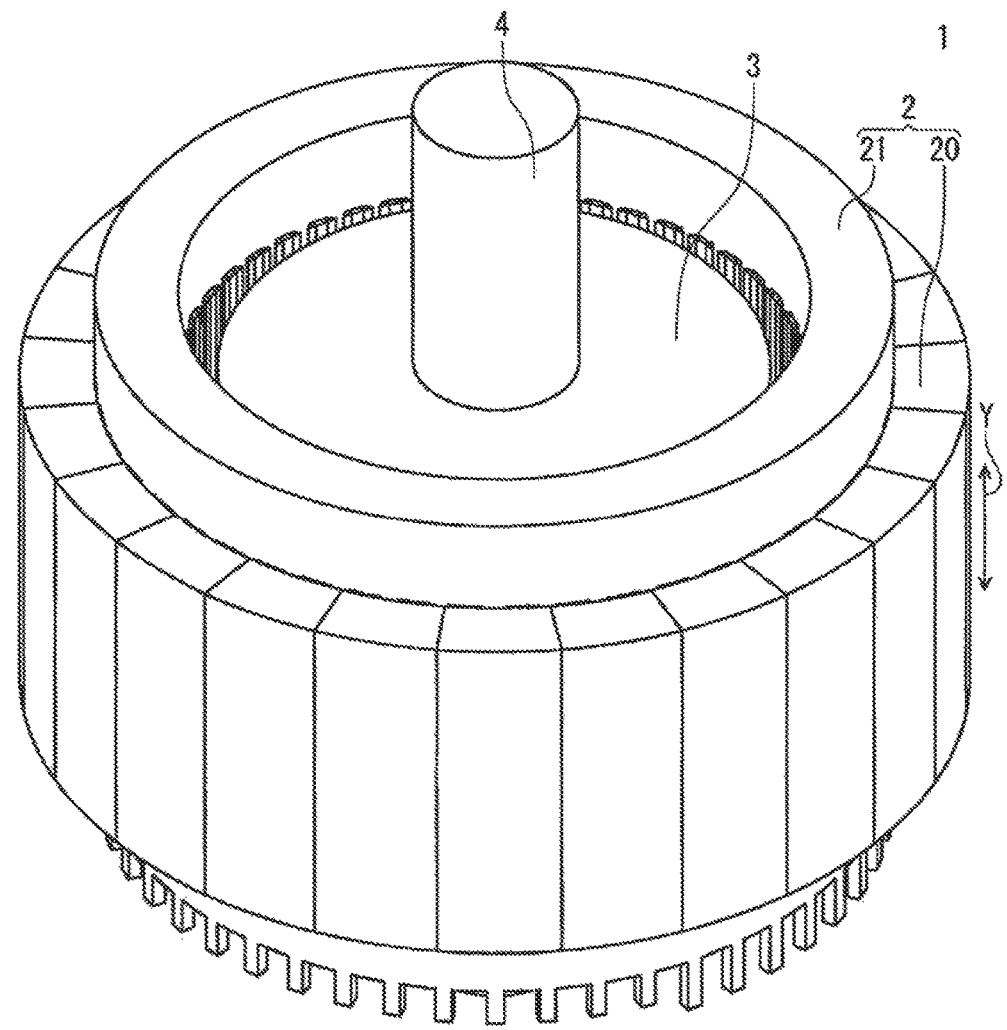
FIG. 4 is a perspective view showing the structure of a rotating electric machine formed with the rotor shown in FIG. 1.
Figure 5:
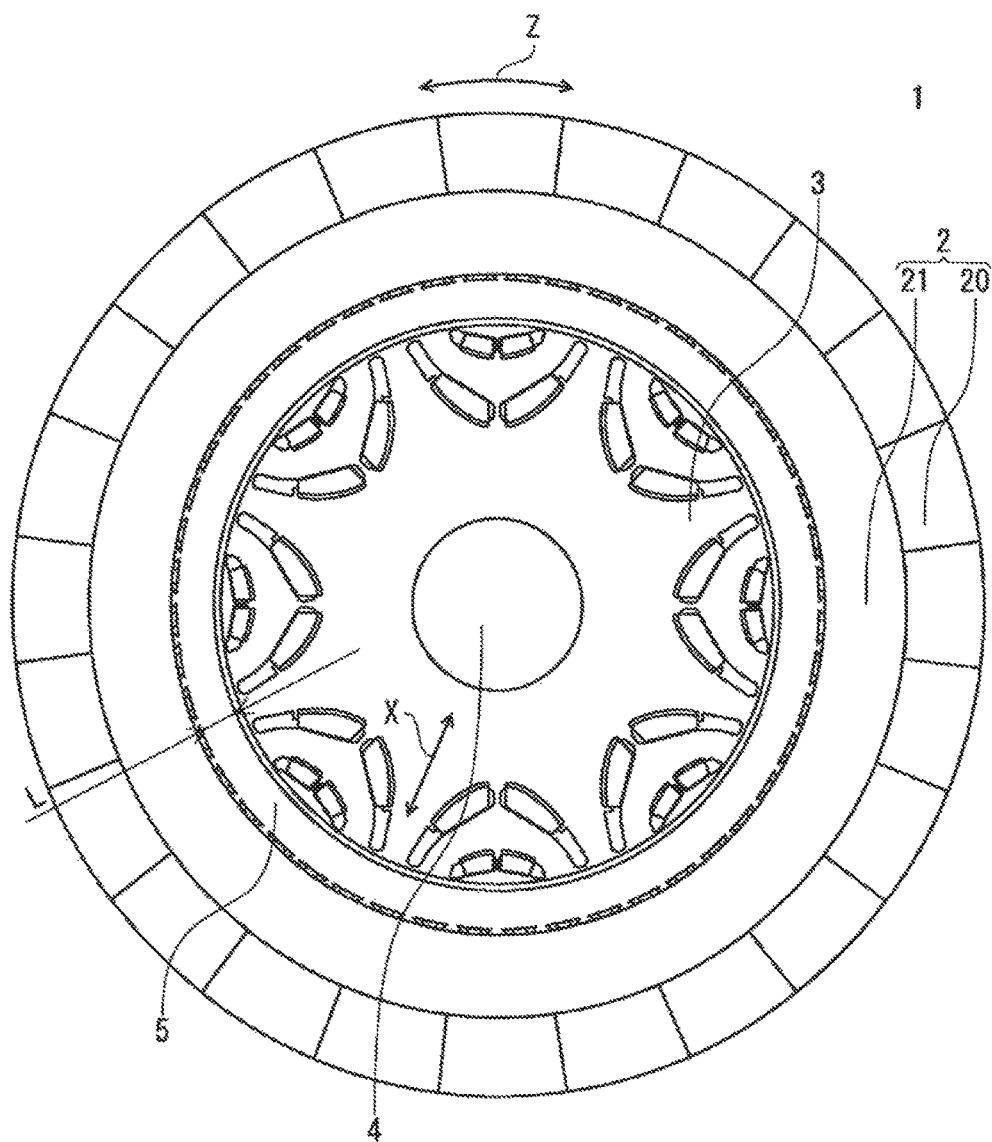
FIG. 5 is a plan view showing the structure of the rotating electric machine shown in FIG. 3.
Figure 6:
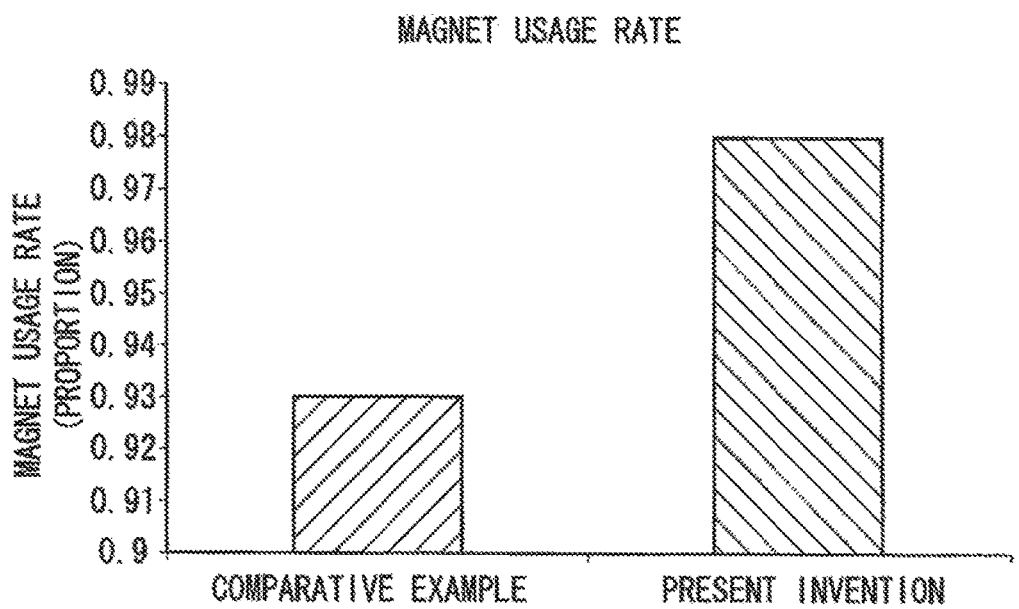
FIG. 6 shows magnet usage rates of the rotating electric machine of the present invention and a rotating electric machine of a comparative example.

Hereinafter, embodiments of the invention of the present application will be described. FIG. 1 is a plan view showing the structure of a rotor according to embodiment 1 of the present invention. FIG. 2 is a partially enlarged plan view showing the structure of a ⅛ model of the rotor shown in FIG. 1. FIG. 3 is a partially enlarged plan view showing the structure of half of the rotor shown in FIG. 2. FIG. 4 is a perspective view showing the structure of a rotating electric machine formed with the rotor shown in FIG. 1. FIG. 5 is a plan view showing the structure of the rotating electric machine shown in FIG. 4. FIG. 6 shows magnet usage rates of the rotating electric machine of the present invention and a rotating electric machine of a comparative example. Only in FIG. 2, hatching is applied for the purpose of understanding structures. In the other figures, the same structures are shown and therefore hatching is omitted.

In the present embodiment, the case of using a permanent-magnet-type rotating electric machine 1 with eight poles and forty-eight slots will be described as an example. It is noted that the number of poles and the number of slots in the rotating electric machine 1 can be increased or decreased as appropriate, and rotating electric machines in such cases can also be configured in the same manner in the present embodiment and the other embodiments. Therefore, the description thereof is omitted as appropriate.

In FIG. 4 and FIG. 5, the rotating electric machine 1 is composed of a stator 2, a rotor 3, and a shaft 4. The stator 2, the rotor 3, and the shaft 4 are arranged in this order from the outer circumferential side of the rotating electric machine 1. The stator 2 is arranged with an air gap 5, which is a space, from the rotor 3. A length L of the air gap 5 in a radial direction X is set at 0.1 mm to 2.5 mm.

The stator 2 includes a stator core 20 and a coil 21. The stator core 20 is formed in an annular shape. The stator core 20 is formed by stacking a plurality of electromagnetic steel sheets in an axial direction Y, for example. The thickness of each of the electromagnetic steel sheets to be used is often 0.1 mm to 1.0 mm. In the present embodiment, the case of forming the stator core 20 from electromagnetic steel sheets is shown as an example, but without limitation thereto, the stator core 20 may be formed from materials other than electromagnetic steel sheets, and the same applies to the other embodiments. Therefore, the description thereof is omitted as appropriate. The coil 21 wound around the stator core 20 may be formed in either a distributed winding manner or a concentrated winding manner.

The rotor 3 is formed with a rotor core 30 fixed to the shaft 4 inserted on the center axis. The rotor 3 is a permanent magnet rotor having the rotor core 30 arranged inside the stator 2, and having permanent magnets 6. The shaft 4 is fixed to the rotor core 30 by, for example, shrink fit or press fit.

Next, the details of the structure of the rotor 3 will be described with reference to FIG. 1 to FIG. 3. As shown in FIG. 1, the rotor 3 is composed of: the rotor core 30 in which a plurality of insertion holes 7 penetrating in the axial direction Y are formed at intervals in a circumferential direction Z; the permanent magnets 6 (hereinafter, permanent magnets are referred to as magnets) arranged in the respective insertion holes 7; and the shaft 4 for rotating the rotor core 30.

Therefore, the magnets 6 are formed in such sizes and shapes as to be able to be inserted into the respective insertion holes 7. In the following description, when the magnets 6 and the insertion holes 7 are mentioned, all the magnets 6 and insertion holes 7 in the rotor 3 are referred to.

As shown in FIG. 2, a plurality of insertion holes 7 are formed at intervals in the circumferential direction Z of the rotor core 30, and formed in a plurality of layers in the radial direction X. In the present embodiment, the case where the insertion holes 7 are arranged in two layers in the radial direction X will be described. The insertion holes 7 include two layers of a first insertion hole 71 and a second insertion hole 72. In the first insertion hole 71, a first bridge portion 41 is formed on the magnetic pole center axis, and thus the first insertion hole 71 is divided into a first insertion hole 71A and a first insertion hole 71B having shapes line-symmetric between left and right with respect to the center axis. In the second insertion hole 72, a second bridge portion 42 is formed on the magnetic pole center axis, and thus the second insertion hole 72 is divided into a second insertion hole 72A and a second insertion hole 72B having shapes line-symmetric between left and right with respect to the center axis.

A first magnet 61A and a first magnet 61B are respectively inserted in the first insertion hole 71A and the first insertion hole 71B, and a second magnet 62A and a second magnet 62B are respectively inserted into the second insertion hole 72A and the second insertion hole 72B. Therefore, first magnets 61 are composed of the first magnet 61A and the first magnet 61B, and second magnets 62 are composed of the second magnet 62A and the second magnet 62B. Regarding each magnet 6, in particular, as shown in FIG. 3, a width H1 thereof in the radial direction X on a side near the magnetic pole center axis of the insertion hole 7 is longer than a width H2 in the radial direction X on a side far from the magnetic pole center axis of the insertion hole 7.

As shown in FIG. 3, a first adhesion layer portion 11 is formed between a hole outer side peripheral surface 80 of the first insertion hole 71 and a magnet outer side peripheral surface 90 of the first magnet 61, thereby fixing them. In addition, a second adhesion layer portion 12 is formed between a hole outer side peripheral surface 80 of the second insertion hole 72 and a magnet outer side peripheral surface 90 of the second magnet 62, thereby fixing them.

Each hole outer side peripheral surface 80 at which the first adhesion layer portion 11 is formed and which is a side surface in the circumferential direction Z on the outer side in the radial direction X of the first insertion hole 71, is formed in a flat-surface shape. Each magnet outer side peripheral surface 90 at which the first adhesion layer portion 11 is formed and which is a surface in the circumferential direction Z on the outer side in the radial direction X of the first magnet 61, is formed in a flat-surface shape. Similarly, each hole outer side peripheral surface 80 at which the second adhesion layer portion 12 is formed and which is a side surface in the circumferential direction Z on the outer side in the radial direction X of the second insertion hole 72, is formed in a flat-surface shape. Each magnet outer side peripheral surface 90 at which the second adhesion layer portion 12 is formed and which is a surface in the circumferential direction Z on the outer side in the radial direction X of the second magnet 62, is formed in a flat-surface shape.

A hole inner side peripheral surface 81 which is a side surface in the circumferential direction Z on the inner side in the radial direction X of each insertion hole 71, 72, is formed in an arc-surface shape that is convex inward in the radial direction X of the rotor 3. A magnet inner side peripheral surface 91 which is a surface in the circumferential direction Z on the inner side in the radial direction X of each magnet 61, 62, is formed in an arc-surface shape that is convex inward in the radial direction X of the rotor 3.

The insertion hole 7 and the magnet 6 are adhered by each adhesion layer portion 11, 12. The hole inner side peripheral surface 81 of the first insertion hole 71 and the magnet inner side peripheral surface 91 of the first magnet 61 are not in contact with each other and a space is provided therebetween to form a first gap portion 51. The hole inner side peripheral surface 81 of the second insertion hole 72 and the magnet inner side peripheral surface 91 of the second magnet 62 are not in contact with each other and a space is provided therebetween to form a second gap portion 52.

A width T1 in the radial direction X of the first gap portion 51 is longer than a width T2 in the radial direction X of the first adhesion layer portion 11. Similarly, a width T3 in the radial direction X of the second gap portion 52 is longer than a width T4 in the radial direction X of the second adhesion layer portion 12. Specifically, the widths T2, T4 are about 0.03 mm to 0.15 mm. The widths T1, T3 are longer than the widths T2, T4 but are about 1 mm or less.

On the hole inner side peripheral surface 81 of each first insertion hole 71A, 71B, a first projection 82 is formed which projects outward in the radial direction X and contacts with a circumferential-direction-side end surface 93 of each first magnet 61A, 61B on a side opposite to the first bridge portion 41 side in the circumferential direction Z. On the first bridge portion 41 between the first insertion holes 71, a second projection 83 is formed which projects toward the first magnet 61 side in each first insertion hole 71 and contacts with each first magnet 61. Each projection 82, 83 serves as a contact stopper for preventing the first magnet 61 inserted in the first insertion hole 71 from moving during rotation of the rotor core 30.

Hole circumferential-direction-side end surfaces 84 of the first insertion holes 71A, 71B are formed in an arc shape. In the first insertion holes 71A, 71B, there are spaces where the first magnets 61A, 61B are not present, and these spaces serve as flux barrier portions 8.

On the hole inner side peripheral surface 81 of each second insertion hole 72A, 72B, a first projection 82 is formed which projects outward in the radial direction X and contacts with a circumferential-direction-side end surface 93 of each second magnet 62A, 62B on a side opposite to the second bridge portion 42 side in the circumferential direction Z. On the second bridge portion 42 between the second insertion holes 72, a second projection 83 is formed which projects on the second magnet 62 side in each second insertion hole 72 and contacts with each second magnet 62. Each projection 82, 83 serves as a contact stopper for preventing the second magnet 62 inserted in the second insertion hole 72 from moving during rotation of the rotor core 30.

Hole circumferential-direction-side end surfaces 84 of the second insertion holes 72A, 72B are formed in an arc shape. In the second insertion holes 72A, 72B, there are spaces where the second magnets 62A, 62B are not present, and these spaces serve as flux barrier portions 8.

Next, a method for manufacturing the rotor of the rotating electric machine of embodiment 1 configured as described above will be described. First, an adhesive agent is applied on the magnet outer side peripheral surface 90 of each magnet 6. As the adhesive agent, any material that enables fixation between the magnet 6 and the insertion hole 7 may be used. For example, the adhesive agent is applied with a thickness of about 0.03 mm to 0.15 mm (corresponding to widths T2, T4). Next, the magnet 6 is inserted into the insertion hole 7. At this time, in order that the adhesive agent will not adhere to a part other than a necessary part, the magnet 6 is inserted such that the magnet outer side peripheral surface 90 thereof on the side where the adhesive agent is applied moves along the hole outer side peripheral surface 80 of the insertion hole 7.

Next, each magnet 6 is moved outward in the radial direction X so that the adhesive agent on the magnet 6 is pressed to the hole outer side peripheral surface 80, to cure the adhesive agent. This pressing step may be performed on any condition that does not cause the magnet 6 or the insertion hole 7 to crack or chip, and means and the number of times for pressing the magnet 6 to the insertion hole 7 are not particularly limited. Thus, the first adhesion layer portions 11 and the second adhesion layer portions 12 are each formed between the magnet outer side peripheral surface 90 of the magnet 6 and the hole outer side peripheral surface 80 of the insertion hole 7. In addition, the circumferential-direction-side end surfaces 93 of each magnet 6 are in contact with the first projection 82 and the second projection 83.

Here, the magnet outer side peripheral surface 90 of each magnet 6 and the hole outer side peripheral surface 80 of each insertion hole 7, on which the first adhesion layer portion 11 and the second adhesion layer portion 12 are adhered, are formed in a flat-surface shape, and therefore, as compared to the case where these surfaces are formed in a curved-surface shape, positioning of the magnet 6 is facilitated, and since the magnet 6 and the insertion hole 7 are in surface-to-surface contact with each other, adhesion and fixation can be made strongly and stably. Further, since the circumferential-direction-side end surfaces 93 of each magnet 6 are in contact with the first projection 82 and the second projection 83, the position of the magnet 6 is stabilized.

At this time, the magnet inner side peripheral surface 91 of each magnet 6 and the hole inner side peripheral surface 81 of each insertion hole 7 are not in contact with each other, and a space is provided between the magnet inner side peripheral surface 91 of each magnet 6 and the hole inner side peripheral surface 81 of each insertion hole 7, whereby the first gap portion 51 and the second gap portion 52 are formed.

Next, a method for assembling the rotating electric machine 1 using the rotor 3 manufactured as described above will be described. For the stator 2, electromagnetic steel sheets as a main material are stamped to form the stator core 20. It is noted that the method for forming the stator core 20 is not limited to stamping of electromagnetic steel sheets. Next, the coil 21 assembled in an annular shape, to which an insulation sheet is attached, is inserted into the stator core 20. It is noted that the method for assembling the coil 21 and the stator core 20 is not limited to the above method. Next, the shaft 4 is fixed to the rotor core 30 of the rotor 3 manufactured as described above. Next, the rotor 3 is inserted into the stator 2 with the air gap 5 therebetween, and thus they are assembled and the rotating electric machine 1 is manufactured. It is noted that, also in the other embodiments below, the rotating electric machine 1 can be configured in the same manner, and therefore the description and illustration thereof are omitted.

In embodiment 1 configured as described above, the rotor is configured such that, the hole inner side peripheral surface of each insertion hole and the magnet inner side peripheral surface of each magnet are not in contact with each other so that a space is formed therebetween, an adhesion layer portion is formed between the hole outer side peripheral surface of each insertion hole and the magnet outer side peripheral surface of each magnet, the hole outer side peripheral surface of each insertion hole and the magnet outer side peripheral surface of each magnet with which the adhesion layer portion contacts are formed in a flat-surface shape, the width in the radial direction of the space between each insertion hole and each magnet is longer than the width in the radial direction of the adhesion layer portion. In addition, the rotating electric machine is provided with the rotor, a rotary shaft for rotating the rotor core, and a stator having a coil and located with an air gap from the rotor. In the above rotor and rotating electric machine, reduction of torque performance can be suppressed and the magnets can be stably held.

Specifically, FIG. 6 shows a magnet usage rate of a rotor in a comparative example in which the width in the radial direction of the space between the hole inner side peripheral surface of each insertion hole and the magnet inner side peripheral surface of each magnet is shorter than the width in the radial direction of the adhesion layer portion between the hole outer side peripheral surface of each insertion hole and the magnet outer side peripheral surface of each magnet, and a magnet usage rate of the rotor corresponding to the invention of the present application, in which the width in the radial direction of the space between the hole inner side peripheral surface of each insertion hole and the magnet inner side peripheral surface of each magnet is longer than the width in the radial direction of the adhesion layer portion between the hole outer side peripheral surface of each insertion hole and the magnet outer side peripheral surface of each magnet. Calculations of both magnet usage rates were performed under the same condition. This time, the magnitude of torque per unit area of magnet, which serves as an index of torque, is shown as the result of magnet usage rates. As is obvious from FIG. 6, it is found that the magnet usage rate in the present invention is greater than in the comparative example. Thus, it has been confirmed that reduction of the magnet usage rate is suppressed by the present invention.

Each magnet is formed such that the width in the radial direction on a side near the magnetic pole center axis of the insertion hole is longer than the width in the radial direction on a side far from the magnetic pole center axis of the insertion hole. Therefore, the salient pole ratio of the magnet can be increased, and a difference between a q-axis inductance Lq and a d-axis inductance Ld for generating torque is increased, whereby torque can be increased.

The first projection projecting outward in the radial direction is formed on the hole inner side peripheral surface of each insertion hole. This first projection is formed in contact with the circumferential-direction-side end surface of the magnet. Therefore, during rotation of the rotor, even if the magnet comes off, since the magnet is in contact with the first projection, concentration of stress applied to the rotor core can be relaxed and positional accuracy can be improved. Further, variation among directions of the magnetic fluxes due to position deviation of magnets can be reduced.

In the insertion holes divided by the bridge portion, the magnets are arranged symmetrically between left and right with respect to the magnetic pole center axis of the insertion holes. Therefore, even if parallel orientation is performed instead of radial orientation, the orientation can be concentrated on the center of the magnetic pole. Here, the radial orientation refers to that a magnet is molded with an orientation magnetic field applied radially during magnetic field application in a magnet molding step, and the parallel orientation refers to that a magnet is molded with an orientation magnetic field applied in parallel during magnetic field application in a magnet molding step. In the case of adjusting the orientation magnetic field uniformly, the adjustment can be performed more easily by the parallel orientation than by the radial orientation.

The second projection which projects toward the magnet side in each insertion hole and contacts with the magnet is formed on the bridge portion between the insertion holes divided by the bridge portion. Therefore, during rotation of the rotor, even if the magnet comes off, since the magnet is in contact with the second projection, concentration of stress applied to the rotor core can be relaxed and positional accuracy can be improved. Further, variation among directions of the magnetic fluxes due to position deviation of magnets can be reduced.

The hole circumferential-direction-side end surface of each insertion hole is formed in an arc shape. Therefore, concentration of stress applied to the rotor core part other than the insertion holes during rotation of the rotor can be relaxed.

The insertion holes are formed in a plurality of layers in the radial direction. Therefore, it is possible to adapt to various magnet arrangements.

The flux barrier portions are formed on both end sides of the insertion holes and the magnets. Therefore, leakage of a magnetic flux when the rotating electric machine is operated can be reduced.

In the present embodiment, the case where the magnets and the insertion holes are arranged one by one symmetrically between left and right with respect to the magnetic pole center axis has been shown as an example. However, without limitation thereto, the numbers of the magnets and the insertion holes to be arranged on each side may be two or more as long as they are arranged symmetrically between left and right with respect to the magnetic pole center axis, and even in such a case, the same configuration can be applied and the same effect can be provided.

Embodiment 2

Figure 7:
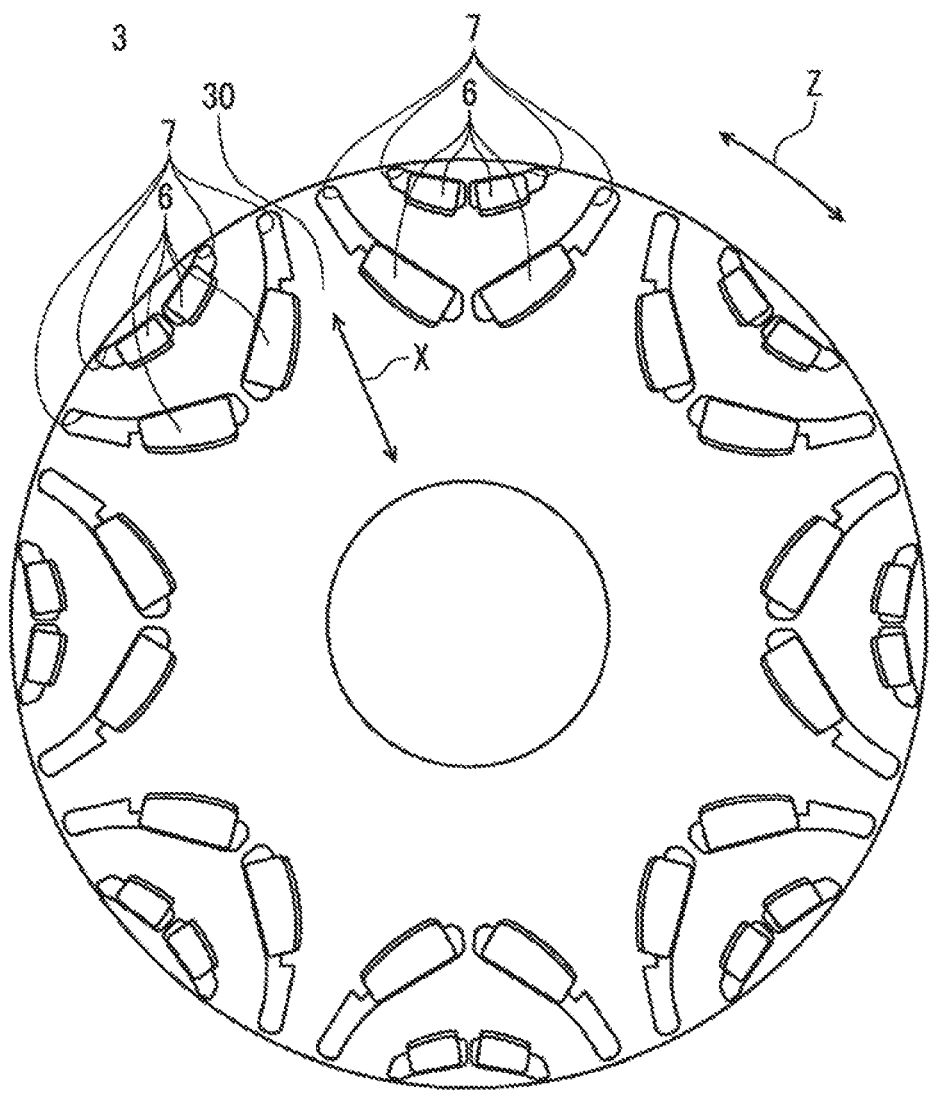
FIG. 7 is a plan view showing the structure of a rotor according to embodiment 2 of the present invention.
Figure 8:
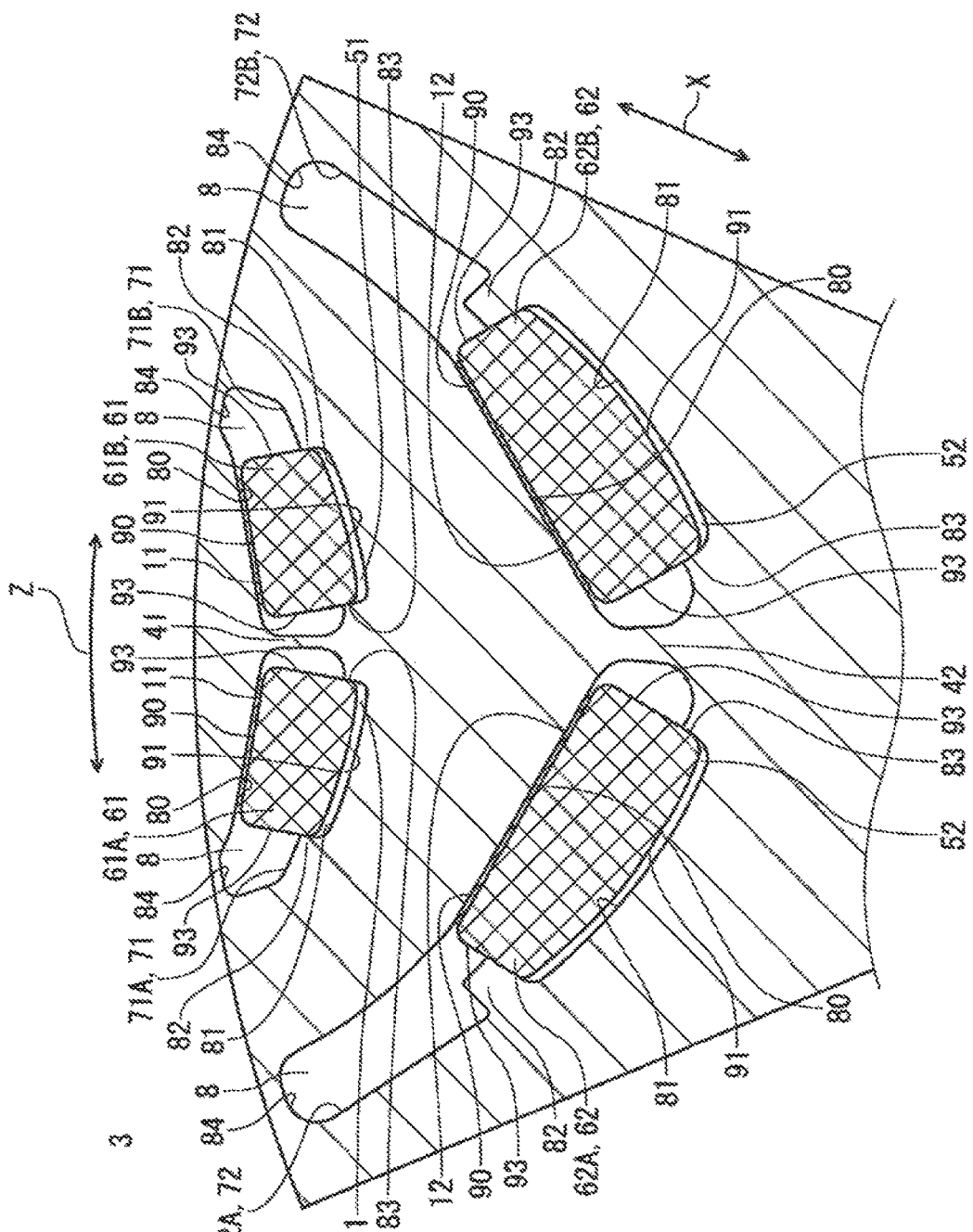
FIG. 8 is a partially enlarged plan view showing the structure of the rotor shown in FIG. 7.
Figure 9:
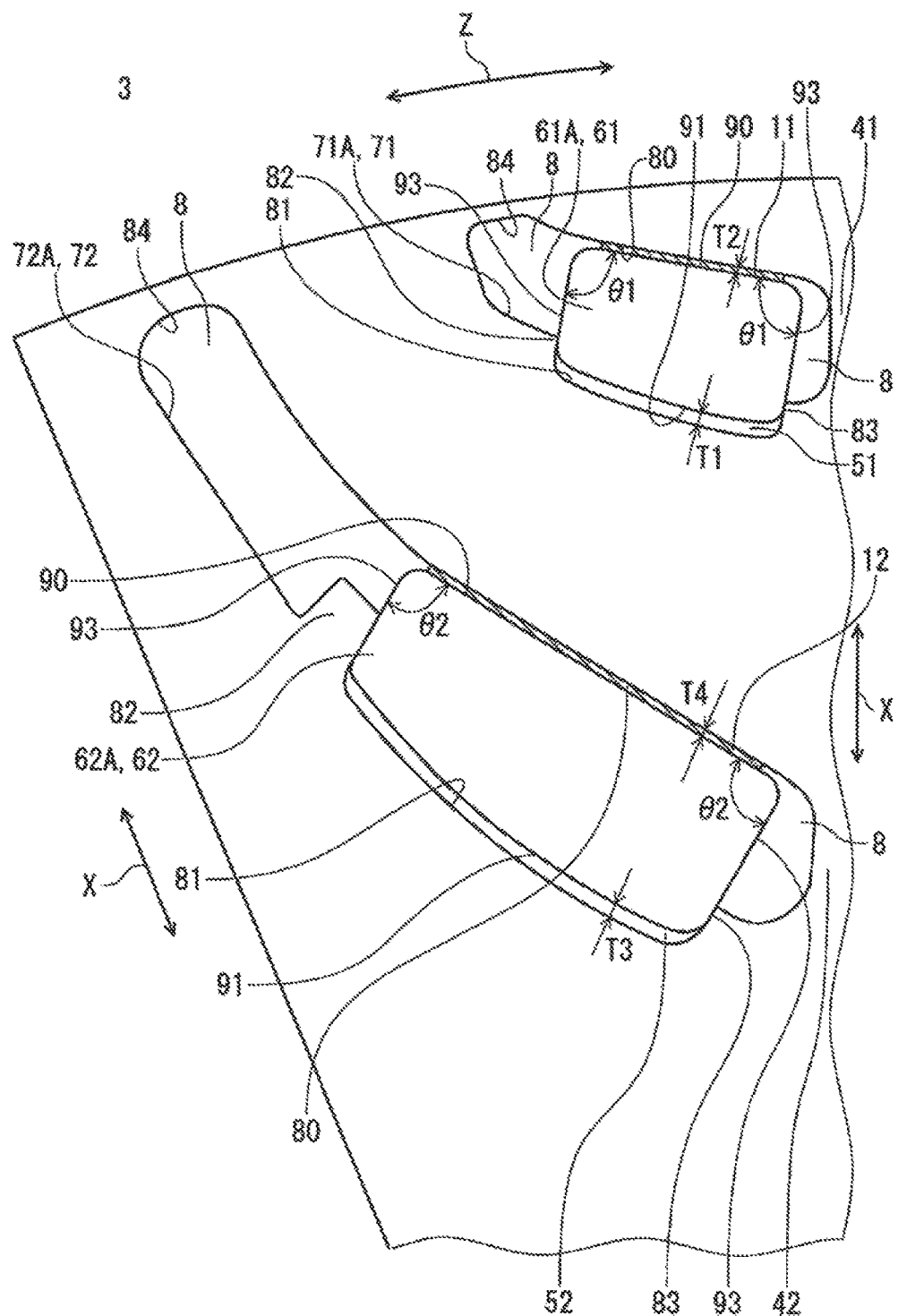
FIG. 9 is a partially enlarged plan view showing the structure of the rotor shown in FIG. 8.
Figure 10:
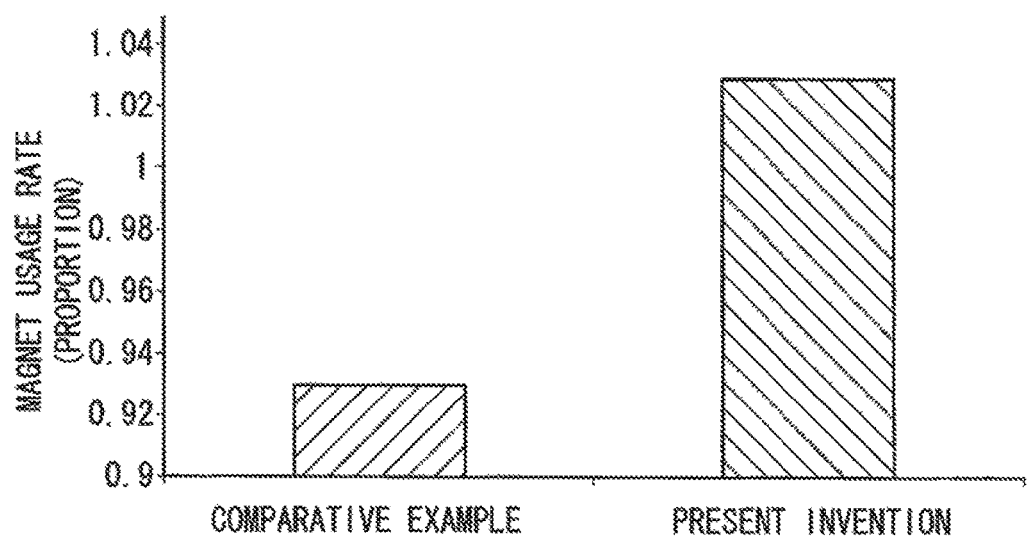
FIG. 10 shows magnet usage rates of a rotating electric machine of the present invention and a rotating electric machine of a comparative example.

FIG. 7 is a plan view showing the structure of a rotor according to embodiment 2 of the present invention. FIG. 8 is a partially enlarged plan view showing the structure of a ⅛ model of the rotor shown in FIG. 7. FIG. 9 is a partially enlarged plan view showing the structure of half of the rotor shown in FIG. 8. FIG. 10 shows magnet usage rates of a rotating electric machine of the present invention and a rotating electric machine of a comparative example. Only in FIG. 8, hatching is applied for the purpose of understanding structures. In the other figures, the same structures are shown and therefore hatching is omitted.

In the drawings, the same parts as in the above embodiment 1 are denoted by the same reference characters and the description thereof is omitted. In the present embodiment 2, angles θ1 and θ2 between the circumferential-direction-side end surfaces 93 and the magnet outer side peripheral surface 90 of each magnet 6 are set to 90 degrees. The other configuration is the same as in the above embodiment 1, and manufacturing can be performed in the same manner.

In embodiment 2 configured as described above, the same effects as in the above embodiment 1 are provided, and further, the following effects are provided. Since the angles between the magnet outer side peripheral surface of each magnet and the circumferential-direction-side end surfaces of the magnet are set to 90 degrees, it becomes easy to hold both circumferential-direction-side end surfaces of the magnet, whereby insertion of the magnet into the insertion hole can be facilitated and positional accuracy of the magnet at the time of insertion can be improved. FIG. 10 shows a magnet usage rate in the case where the angles between the magnet outer side peripheral surface of each magnet and the circumferential-direction-side end surfaces of the magnet are set to 90 degrees in the present invention, and a magnet usage rate in the case where the angles are set to different degrees as a comparative example. Calculations of both magnet usage rates were performed under the same condition. As is obvious from FIG. 10, it is found that the magnet usage rate in the present invention is greater than in the comparative example. Thus, it has been confirmed that reduction of the magnet usage rate is suppressed by the present invention.

Embodiment 3

Figure 11:
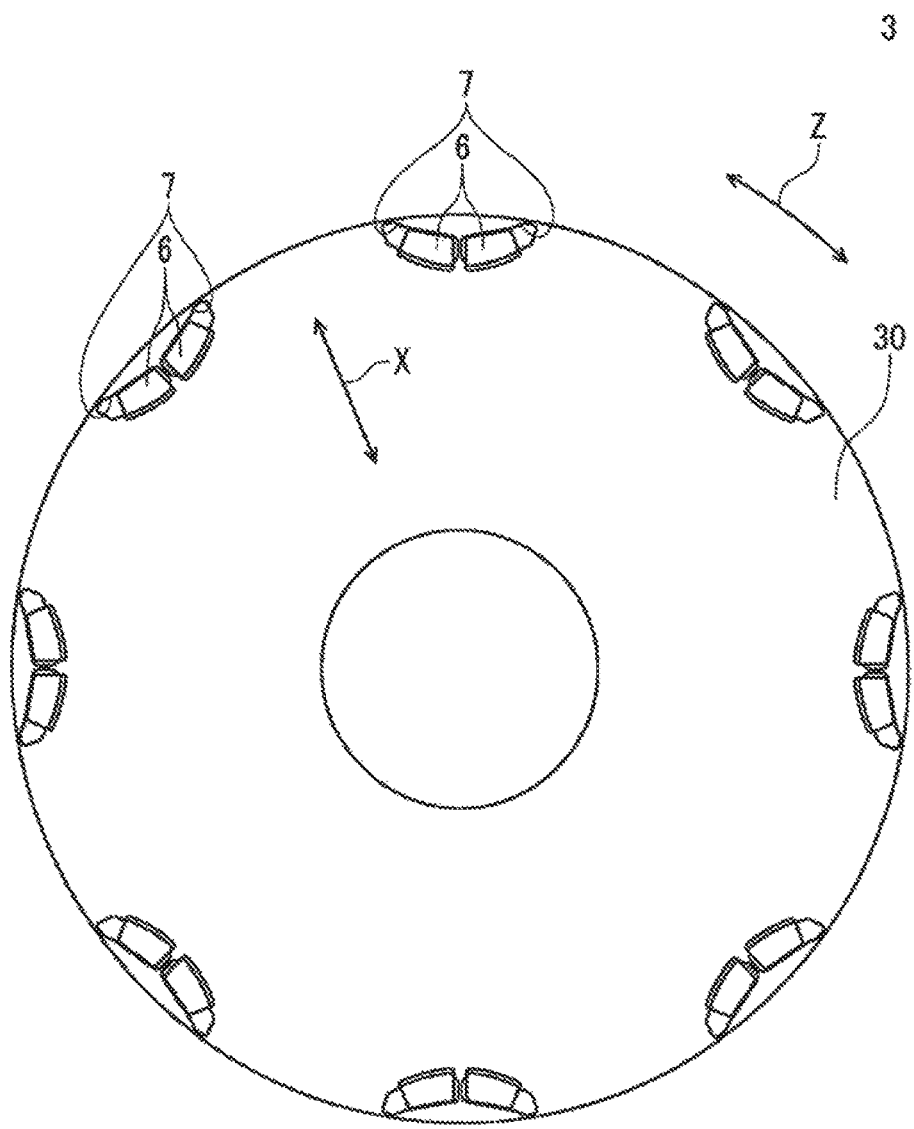
FIG. 11 is a plan view showing the structure of a rotor according to embodiment 3 of the present invention.
Figure 12:
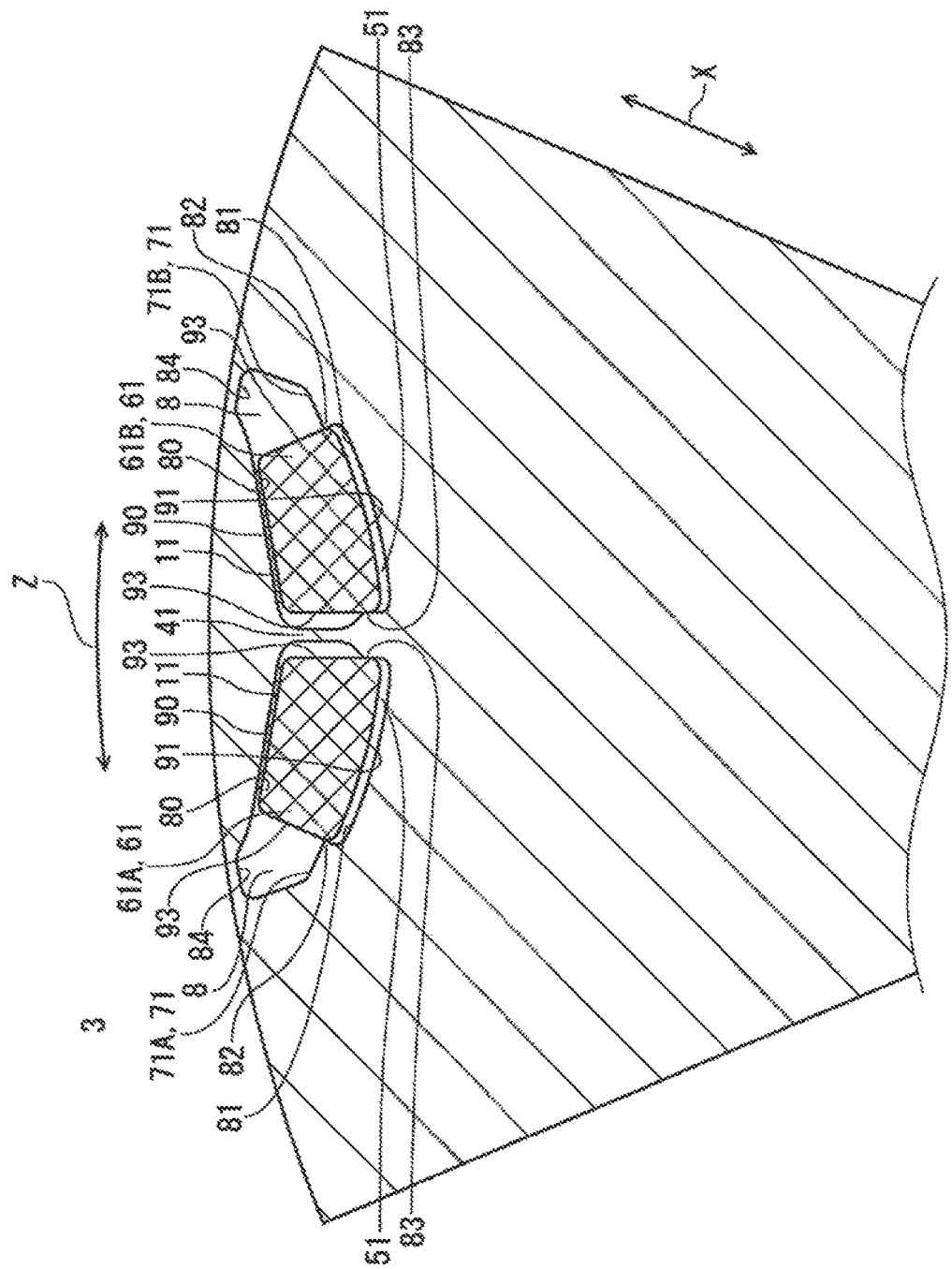
FIG. 12 is a partially enlarged plan view showing the structure of the rotor shown in FIG. 11.
Figure 13:
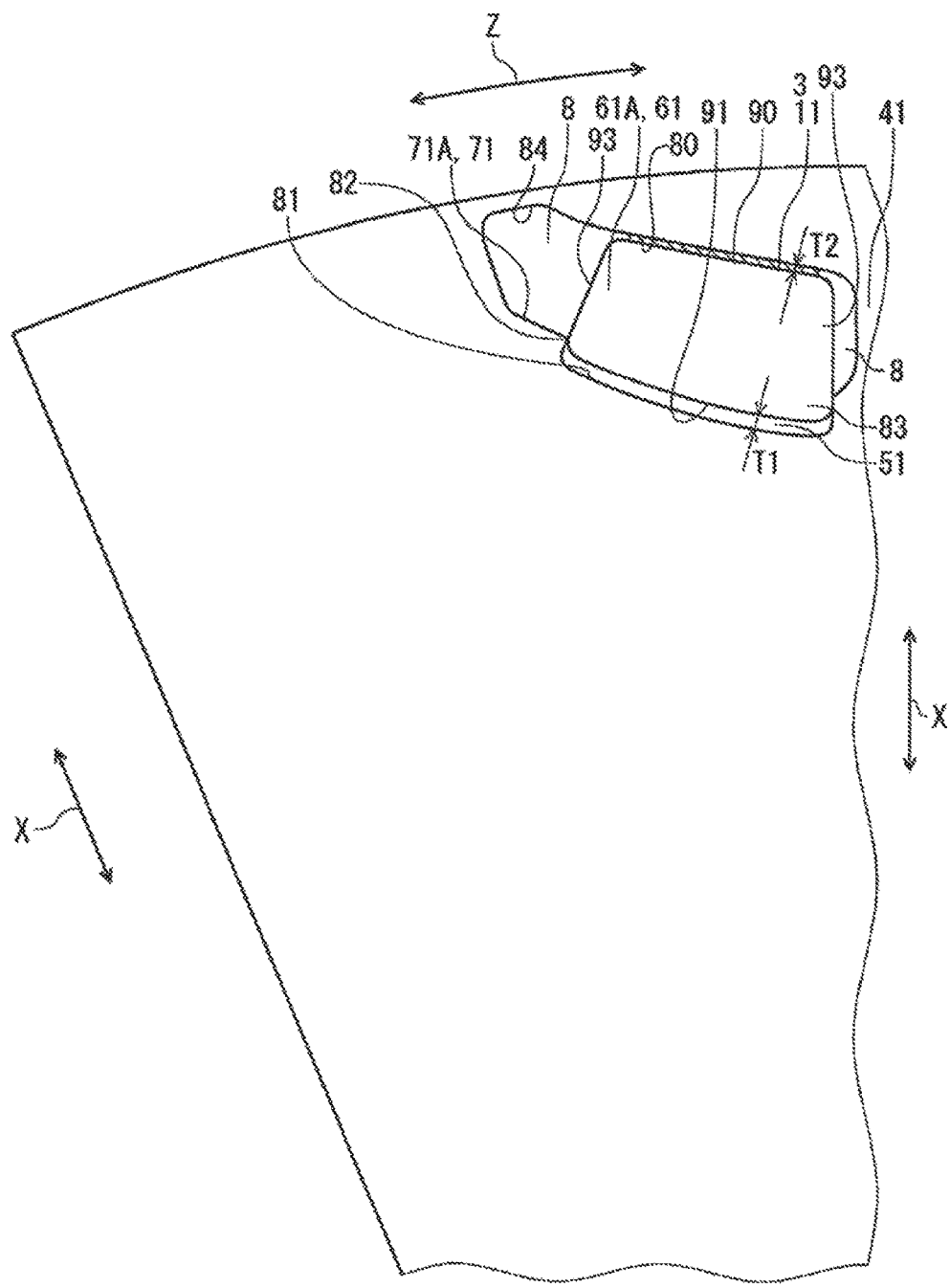
FIG. 13 is a partially enlarged plan view showing the structure of the rotor shown in FIG. 12.
Figure 14:
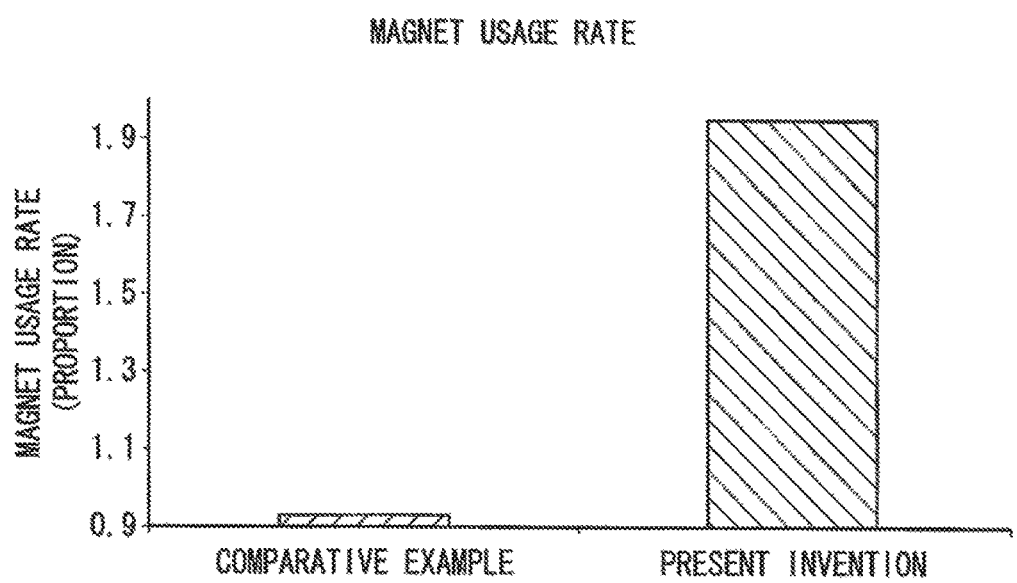
FIG. 14 shows magnet usage rates of a rotating electric machine of the present invention and a rotating electric machine of a comparative example.

FIG. 11 is a plan view showing the structure of a rotor according to embodiment 3 of the present invention. FIG. 12 is a partially enlarged plan view showing the structure of a ⅛ model of the rotor shown in FIG. 11. FIG. 13 is a partially enlarged plan view showing the structure of half of the rotor shown in FIG. 11. FIG. 14 shows magnet usage rates of a rotating electric machine of the present invention and a rotating electric machine of a comparative example. Only in FIG. 12, hatching is applied for the purpose of understanding structures. In the other figures, the same structures are shown and therefore hatching is omitted.

In the drawings, the same parts as in the above embodiments are denoted by the same reference characters and the description thereof is omitted. In the present embodiment 3, the case where the insertion holes 7 are formed in only one layer in the radial direction X is shown as an example. The other configuration is the same as in the above embodiments, and manufacturing can be performed in the same manner.

In embodiment 3 configured as described above, the same effects as in the above embodiments are provided. Specifically, FIG. 14 shows a magnet usage rate of a rotor in a comparative example in which the insertion holes are formed in only one layer in the radial direction, the width in the radial direction of the space between the hole inner side peripheral surface of each insertion hole and the magnet inner side peripheral surface of each magnet is shorter than the width in the radial direction of the adhesion layer portion between the hole outer side peripheral surface of each insertion hole and the magnet outer side peripheral surface of each magnet, and a magnet usage rate of the rotor corresponding to the invention of the present application, in which the width in the radial direction of the space between the hole inner side peripheral surface of each insertion hole and the magnet inner side peripheral surface of each magnet is longer than the width in the radial direction of the adhesion layer portion between the hole outer side peripheral surface of each insertion hole and the magnet outer side peripheral surface of each magnet. Calculations of both magnet usage rates were performed under the same condition. As is obvious from FIG. 14, it is found that the magnet usage rate in the present invention is greater than in the comparative example. Thus, it has been confirmed that reduction of the magnet usage rate is suppressed by the present invention.

Embodiment 4

Figure 15:
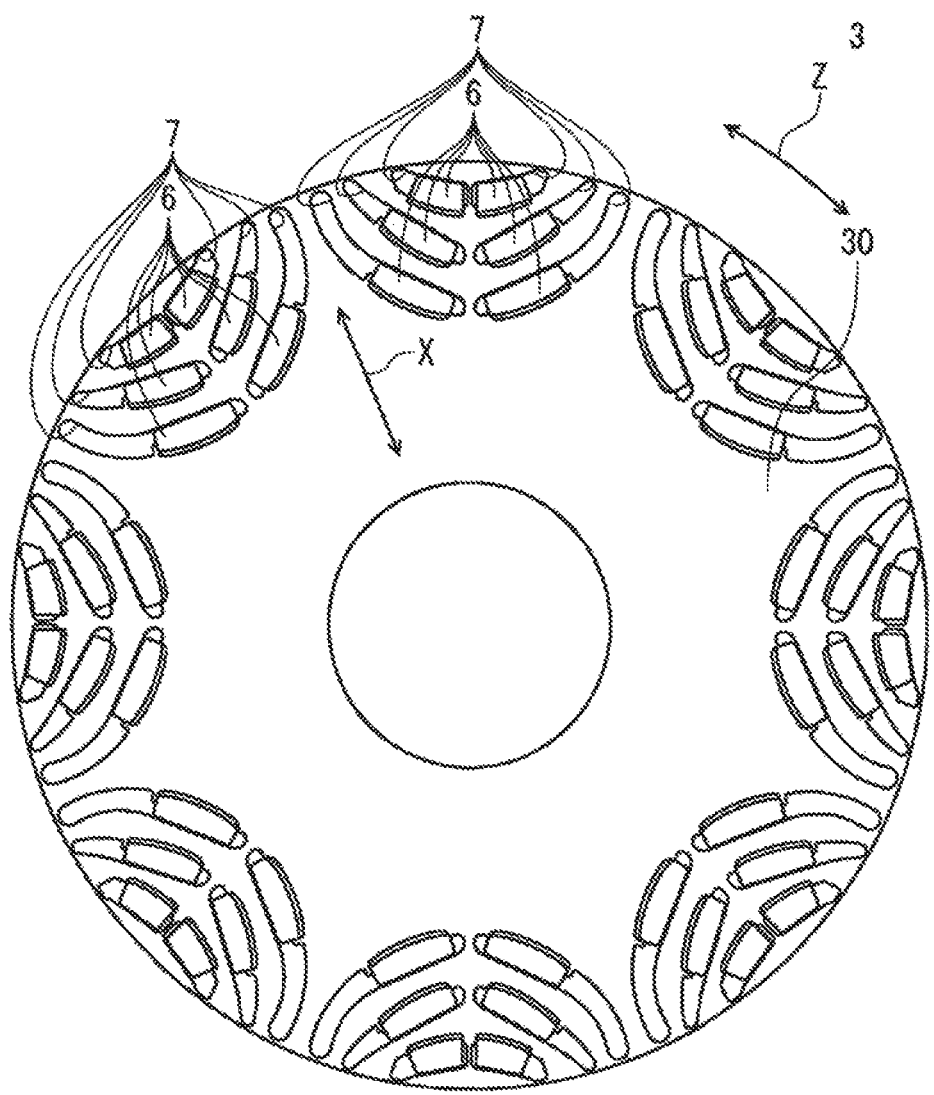
FIG. 15 is a plan view showing the structure of the rotor according to embodiment 4 of the present invention.
Figure 16:
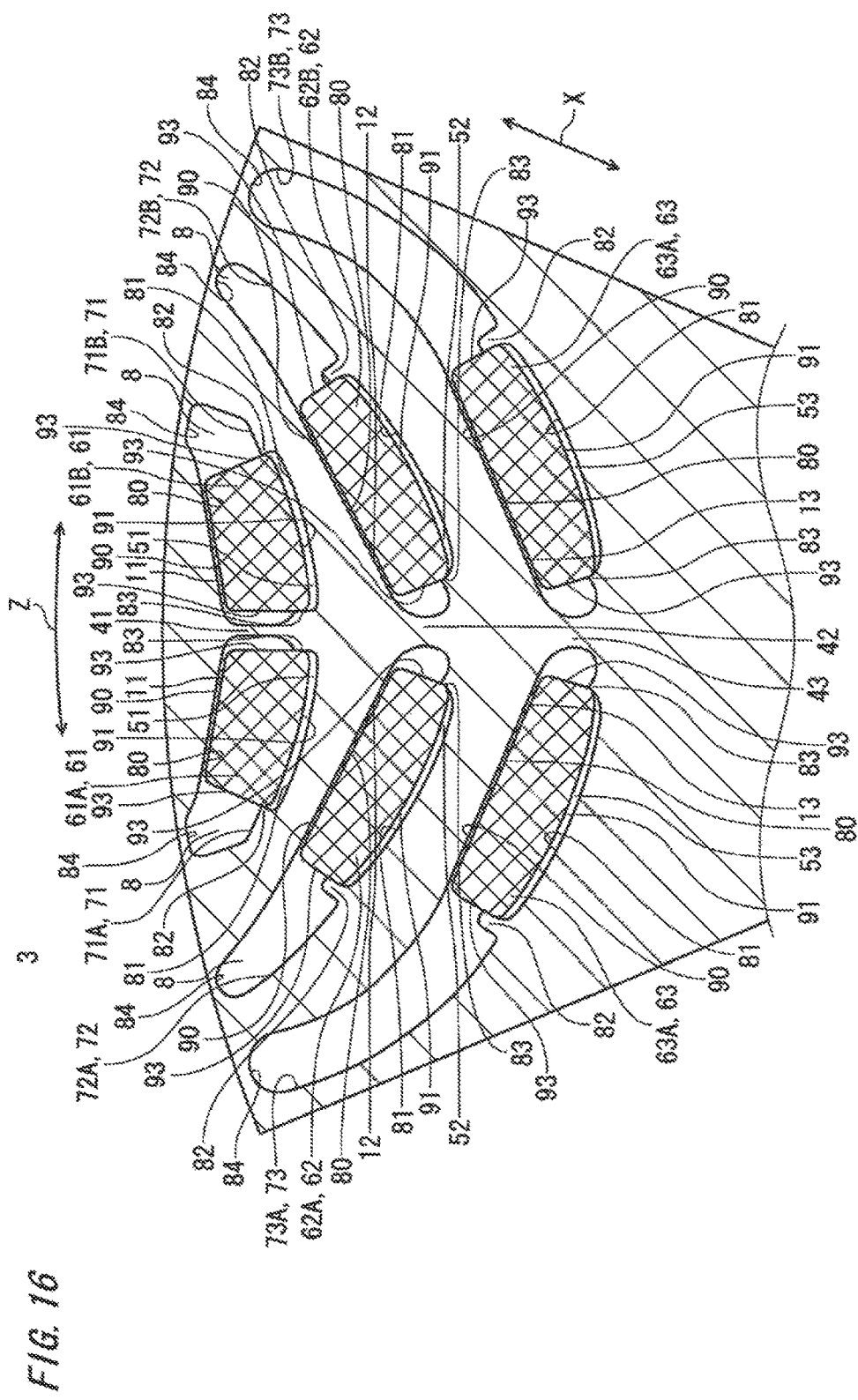
FIG. 16 is a partially enlarged plan view showing the structure of the rotor shown in FIG. 15.
Figure 17:
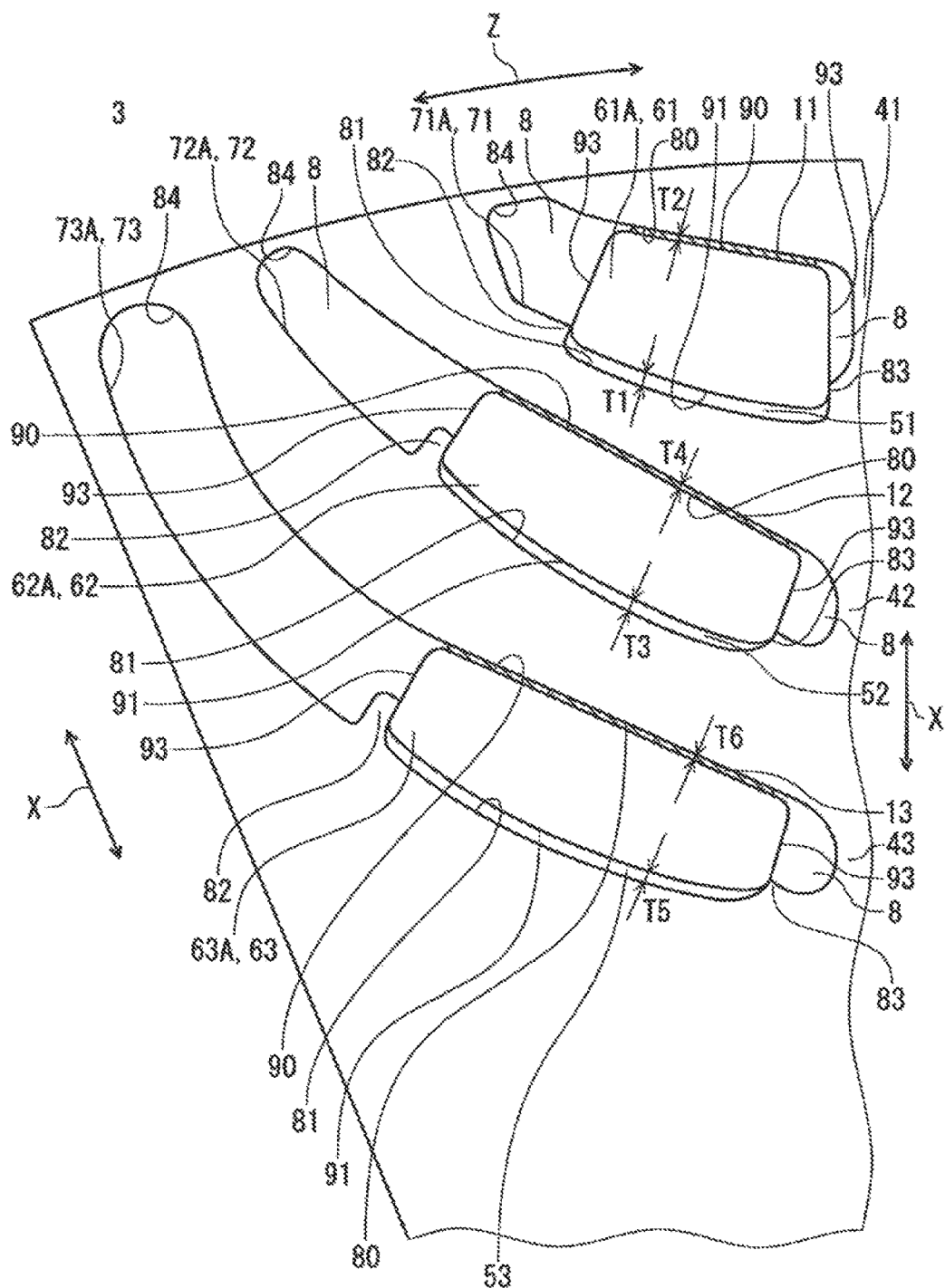
FIG. 17 is a partially enlarged plan view showing the structure of the rotor shown in FIG. 16.

FIG. 15 is a plan view showing the structure of a rotor according to embodiment 4 of the present invention. FIG. 16 is a partially enlarged plan view showing the structure of a ⅛ model of the rotor shown in FIG. 15. FIG. 17 is a partially enlarged plan view showing the structure of half of the rotor shown in FIG. 16. Only in FIG. 16, hatching is applied for the purpose of understanding structures. In the other figures, the same structures are shown and therefore hatching is omitted.

In the drawings, the same parts as in the above embodiments are denoted by the same reference characters and the description thereof is omitted. In the present embodiment 4, the case where the insertion holes 7 are formed in three layers in the radial direction X is shown as an example. The other configuration is the same as in the above embodiments, and manufacturing can be performed in the same manner. The insertion holes 7 include three layers of the first insertion hole 71, the second insertion hole 72, and a third insertion hole 73. In the third insertion hole 73, a third bridge portion 43 is formed on the magnetic pole center axis, and thus the third insertion hole 73 is divided into a third insertion hole 73A and a third insertion hole 73B having shapes line-symmetric between left and right with respect to the center axis.

A third magnet 63A and a third magnet 63B are respectively inserted in the third insertion hole 73A and the third insertion hole 73B. Therefore, third magnets 63 are composed of the third magnet 63A and the third magnet 63B. As shown in FIG. 17, a third adhesion layer portion 13 is formed between a hole outer side peripheral surface 80 of the third insertion hole 73 and a magnet outer side peripheral surface 90 of the third magnet 63, thereby fixing them. Each hole outer side peripheral surface 80 at which the third adhesion layer portion 13 is formed and which is a side surface in the circumferential direction Z on the outer side in the radial direction X of the third insertion hole 73, is formed in a flat-surface shape. Each magnet outer side peripheral surface 90 at which the third adhesion layer portion 13 is formed and which is a surface in the circumferential direction Z on the outer side in the radial direction X of the third magnet 63, is formed in a flat-surface shape.

A hole inner side peripheral surface 81 which is a side surface in the circumferential direction Z on the inner side in the radial direction X of each third insertion hole 73, is formed in an arc-surface shape that is convex inward in the radial direction X of the rotor 3. A magnet inner side peripheral surface 91 which is a surface in the circumferential direction Z on the inner side in the radial direction X of each third magnet 63, is formed in an arc-surface shape that is convex inward in the radial direction X of the rotor 3.

The hole inner side peripheral surface 81 of the third insertion hole 73 and the magnet inner side peripheral surface 91 of the third magnet 63 are not in contact with each other and a space is provided therebetween to form a third gap portion 53. A width T5 in the radial direction X of the third gap portion 53 is longer than a width T6 in the radial direction X of the third adhesion layer portion 13. Specifically, the width T6 is about 0.03 mm to 0.15 mm. The width T5 is longer than the width T6 but is about 1 mm or less.

On the hole inner side peripheral surface 81 of each third insertion hole 73A, 73B, a first projection 82 is formed which projects outward in the radial direction X and contacts with a circumferential-direction-side end surface 93 of each third magnet 63A, 63B on a side opposite to the third bridge portion 43 side in the circumferential direction Z. On the third bridge portion 43 between the third insertion holes 73, a second projection 83 is formed which projects toward the third magnet 63 side in each third insertion hole 73 and contacts with each third magnet 63. Each projection 82, 83 serves as a contact stopper for preventing the third magnet 63 inserted in the third insertion hole 73 from moving during rotation of the rotor core 30.

Hole circumferential-direction-side end surfaces 84 of the third insertion holes 73A, 73B are formed in an arc shape. In the third insertion holes 73A, 73B, there are spaces where the third magnets 63A, 63B are not present, and these spaces serve as flux barrier portions 8.

In embodiment 4 configured as described above, the same effects as in the above embodiments are provided, and further, since the insertion holes and the magnets are arranged in three layers, magnet torque generated by a magnetomotive force of the magnets can be increased.

It is noted that, within the scope of the present invention, the above embodiments may be freely combined with each other, or each of the above embodiments may be modified or simplified as appropriate.

The invention claimed is:

1. A rotor comprising:
a rotor core in which a plurality of insertion holes penetrating in an axial direction are formed at intervals in a circumferential direction; and
magnets respectively provided in the insertion holes, wherein
a hole inner side peripheral surface of each insertion hole and a magnet inner side peripheral surface of each magnet are not in contact with each other so that a space is formed therebetween,
an adhesion layer portion is formed between a hole outer side peripheral surface of each insertion hole and a magnet outer side peripheral surface of each magnet, and the hole outer side peripheral surface of each insertion hole and the magnet outer side peripheral surface of each magnet with which the adhesion layer portion contacts are formed in a flat-surface shape, and
a width in a radial direction of the space is longer than a width in the radial direction of the adhesion layer portion.

2. The rotor according to claim 1, wherein
the hole inner side peripheral surface of each insertion hole and the magnet inner side peripheral surface of each magnet are formed in an arc-surface shape that is convex inward in the radial direction.

3. The rotor according to claim 1, wherein
an angle between the magnet outer side peripheral surface of each magnet and a circumferential-direction-side end surface of the magnet is 90 degrees.

4. The rotor according to claim 1, wherein
each magnet is formed such that a width in the radial direction on a side near a magnetic pole center axis of the insertion hole is longer than a width in the radial direction on a side far from the magnetic pole center axis of the insertion hole.

5. The rotor according to claim 1, wherein
a first projection projecting outward in the radial direction is formed on the hole inner side peripheral surface of each insertion hole, and the first projection is formed in contact with the circumferential-direction-side end surface of the magnet.

6. The rotor according to claim 1, wherein
each insertion hole comprises insertion holes divided by a bridge portion, and
in the insertion holes divided by the bridge portion, the magnets are arranged symmetrically between left and right with respect to the magnetic pole center axis of the insertion holes.

7. The rotor according to claim 6, wherein
on the bridge portion between the insertion holes divided by the bridge portion, a second projection is formed which projects toward a magnet side in each insertion hole and contacts with the magnet.

8. The rotor according to claim 1, wherein
a hole circumferential-direction-side end surface of each insertion hole is formed in an arc shape.

9. The rotor according to claim 1, wherein
the insertion holes are formed in a plurality of layers in the radial direction.

10. A rotating electric machine comprising:
the rotor according to claim 1;
a rotary shaft for rotating the rotor core; and
a stator having a coil and located with an air gap from the rotor.

11. The rotor according to claim 2, wherein
an angle between the magnet outer side peripheral surface of each magnet and a circumferential-direction-side end surface of the magnet is 90 degrees.

12. The rotor according to claim 2, wherein
each magnet is formed such that a width in the radial direction on a side near a magnetic pole center axis of the insertion hole is longer than a width in the radial direction on a side far from the magnetic pole center axis of the insertion hole.

13. The rotor according to claim 2, wherein
a first projection projecting outward in the radial direction is formed on the hole inner side peripheral surface of each insertion hole, and the first projection is formed in contact with the circumferential-direction-side end surface of the magnet.

14. The rotor according to claim 2, wherein
each insertion hole comprises insertion holes divided by a bridge portion, and
in the insertion holes divided by the bridge portion, the magnets are arranged symmetrically between left and right with respect to the magnetic pole center axis of the insertion holes.

15. The rotor according to claim 14, wherein
on the bridge portion between the insertion holes divided by the bridge portion, a second projection is formed which projects toward a magnet side in each insertion hole and contacts with the magnet.

16. The rotor according to claim 2, wherein
a hole circumferential-direction-side end surface of each insertion hole is formed in an arc shape.

17. The rotor according to claim 2, wherein
the insertion holes are formed in a plurality of layers in the radial direction.

18. The rotor according to claim 3, wherein
each magnet is formed such that a width in the radial direction on a side near a magnetic pole center axis of the insertion hole is longer than a width in the radial direction on a side far from the magnetic pole center axis of the insertion hole.

19. The rotor according to claim 3, wherein
a first projection projecting outward in the radial direction is formed on the hole inner side peripheral surface of each insertion hole, and the first projection is formed in contact with the circumferential-direction-side end surface of the magnet.

20. The rotor according to claim 3, wherein
each insertion hole comprises insertion holes divided by a bridge portion, and
in the insertion holes divided by the bridge portion, the magnets are arranged symmetrically between left and right with respect to the magnetic pole center axis of the insertion holes.

* * * * *